Dec. 3, 1929.                B. THAL                1,738,405

SCREW DRIVER

Filed March 28, 1929

INVENTOR.
BERNHARD THAL

BY  David Rines

ATTORNEY.

Patented Dec. 3, 1929

1,738,405

UNITED STATES PATENT OFFICE

BERNHARD THAL, OF CHELSEA, MASSACHUSETTS, ASSIGNOR, BY DIRECT AND MESNE ASSIGNMENTS, TO THE BRIDGEPORT HARDWARE MANUFACTURING CORPORATION, OF BRIDGEPORT, CONNECTICUT, A CORPORATION OF CONNECTICUT

SCREW DRIVER

Application filed March 28, 1929. Serial No. 350,529.

The present invention relates to screw drivers, and its object is to improve upon the present-day construction of screw drivers, to the end that they shall be prevented from slipping during their turning movement.

Figure 2:
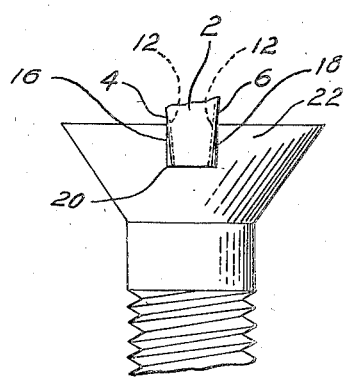
Figure 1:
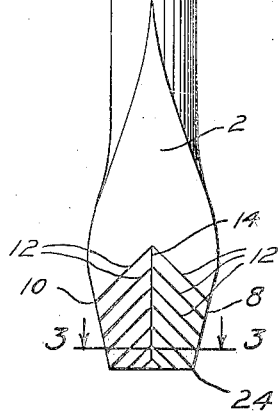
Figure 3:
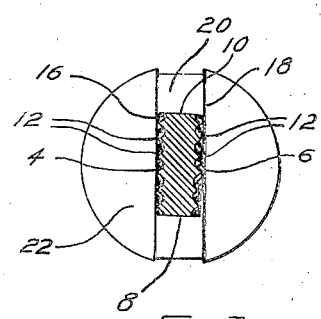
Figure 4:
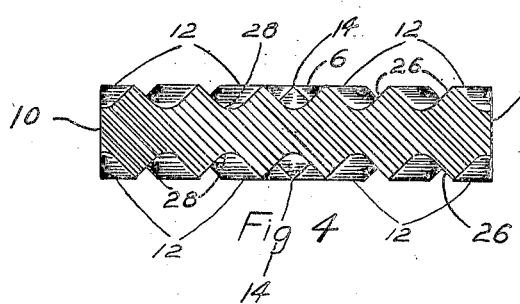
Figure 5:
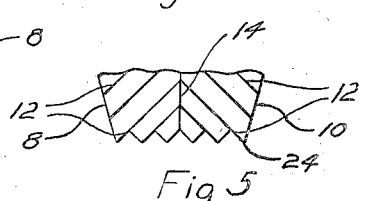

The invention will be explained in connection with the accompanying drawings, in which Fig. 1 is a side elevation of a screwdriver shank constructed according to a preferred embodiment of the present invention; Fig. 2 is a fragmentary end elevation of the same, showing the screw driver in the kerf of a screw head; Fig. 3 is a section showing the preferred screw driver in a screw-head kerf, the section being taken upon the line 3—3 of Fig. 1, looking in the direction of the arrows; Fig. 4 is a section of the screw driver similar to Fig. 3, but upon an enlarged scale; and Fig. 5 is a view of a modification.

The shank 2 of the screw driver, as is usual, is provided with two opposed side faces 4 and 6 and two end faces 8 and 10. According to the preferred embodiment of the invention, ribs 12 are provided upon each of the side faces 4 and 6, the ribs 12 extending from a central longitudinal line 14 of the shank, at an oblique angle to the shank, towards the end faces 8 and 10. The ribs 12 will engage opposite walls 16 and 18 of the kerf 20 of a screw head 22. Depending upon the relative dimensions of the shank and the kerf, the shank may fit snugly in the kerf, as shown in Fig. 2, or loosely, as illustrated in Fig. 3. In either event, the obliquely extending ribs 12 will, by their very obliquity, resist the tendency of the shank bit to slip during the turning movement of the screw, both in a direction longitudinal of the shank and in a direction transverse thereto. The ribs 12 are illustrated as extending at an angle to the shank of about forty-five degrees; but this obliquity may be varied, depending upon whether it is desired to emphasize the prevention of the longitudinal or the prevention of the transverse slipping movement. Indeed, good results are obtainable by having the ribs 12 extend longitudinally of the shank 2, or parallel to the line 14, as the prevention of the transverse slipping is more often of importance than the prevention of the longitudinal slipping. For the same reason, it is undesirable to have the ribs extend at right angles to the shank 2. Other means for preventing both longitudinal and transverse slipping may also be used such, for example, as a series of properly designed pointed projections. According to the preferred form of the invention, as before explained, the ribs are obliquely disposed to prevent slipping in both directions and, therefore, in all directions. The oblique ribs have a further advantage in that some portion of the ribs will engage the walls 16 and 18 of any shape of screw-head kerf 20, whether square, round, etc.

Six such ribs,—three on each side of the central line 14,—along a transverse line where they are most effective, as along the line 3—3 of Fig. 1, have been found to be extraordinarily effective.

The ribs may be formed in any desired manner; but preferably and most simply, they may be cut into the side faces 4 and 6 after the screw driver has previously been manufactured in the ordinary way. The ribs need not be particularly sharp; all that is necessary is that they have the necessary shape for biting into the walls 16 and 18 firmly enough to hold the screw driver against slipping. If the ribs are too sharp, they will have a tendency to break off; and if too obtuse, they will not bite into the walls 16 and 18 of the kerf so well. Ribs of ninety-degree angle in cross section, as illustrated in Fig. 4, are very satisfactory. With this angle, the ribs wear equally on both sides 26 of the rib, and always present an effective biting surface. The portion 28 between the surfaces 26 of two adjacent ribs 12 should be blunt or rounded to minimize the screw driver breaking through at such portions. No special screw-head or kerf construction is necessary, as the screw driver of the present invention will operate very efficiently with any shape of kerf, whether of special construction or standard design. Indeed, the screw driver is almost as completely effective for use with kerfs having walls 16 and 18 that have become worn down as for use with new kerfs, for if one rib 12 misses a worn-down part of the kerf wall, another rib 12 will bite into an adjacent part of the kerf wall.

Screws having kerfs so worn down that it is next to impossibe to turn with screw drivers of ordinary construction respond readily to the turning action of screw drivers built in accordance with the present invention.

In operation, the shank 2 is inserted in the kerf, and the screw driver is turned to drive the screw home, or to unscrew it, as may be desired, for it is equally effective in both directions of rotation. Using ordinary screw drivers, a certain amount of pressure must be exerted upon the screw-driver handle to prevent the shank 2 slipping up out of the kerf 20, and precautions must also be taken to prevent the shank 2 from slipping out of the kerf 20 in a direction longitudinal of the kerf or transverse to the shank 2. No such pressure and no such precaution are necessary with the screw driver of the present invention, for the turning force exerted upon the screw-driver handle is itself sufficient to cause the ribs 12 to bind firmly against the walls of the kerf. Not only that, but, by reason of the oblique nature of the ribs 12, and their engagement against the side walls 16 and 18 of the kerf 20, the screw driver tends to be driven inward towards the bottom wall 20 of the kerf, much as the threads of a screw cause the screw to drive into any wooden object, by mere engagement with the object. Slipping of the screw driver is thus prevented in all directions, up or down or sidewise, with a minimum of effort and attention on the part of the operator. Indeed, so powerful is the effect, that slipping will be prevented even though the screw driver is positioned in the kerf out of alinement with the bottom wall of the kerf 20, or at an angle, say, with one corner 24 only engaging the bottom wall of the kerf 20. Because of this tendency not to slip, furthermore, the working range of the screw driver is increased, as it may operate equally effectively in narrow kerfs or in very wide kerfs.

By using the screw driver of the present invention, therefore, one may be assured that delicate wood work, into which a screw is driven, will not be injured through the screw driver slipping out of the kerf 20 and into contact with the woodwork; that the walls 16 and 18 of the kerf will not be injured through such cause; and that the workman himself is secure from injuries caused by such slipping. As the workman is thus assured, his speed of work will naturally increase, resulting in economies in time and labor.

If desired, the bottom of the screw driver may also be provided with biting teeth 24. These will aid the before-described tendency of the screw driver to pull inward against the bottom wall of the kerf 20.

It is advantageous to have the ribs 12 extend above the line 3—3 of Fig. 1, as the lower portion of the screw driver may be cut off when the ribs 12 thereof are no longer effective, and the screw driver may then be used again, with the upper portion of the ribs 12 as effective as before.

Other modifications will readily occur to persons skilled in the art, and all such are considered to fall within the spirit and scope of the invention, as defined in the appended claims.

What is claimed is:

1. A screw driver comprising a shank provided with a screw-driving bit having two opposite side faces, one of the side faces being formed with sharp edged means for engaging and embedding itself in a wall of a screw-head kerf to resist both longitudinal and transverse slipping of the bit in the kerf during the turning movement of the screw driver.

2. A screw driver comprising a shank provided with a screw-driving bit having two opposite side faces, one of the side faces being formed with one or more ribs extending at an oblique angle to the shank for engaging a wall of a screw-head kerf to resist both longitudinal and transverse slipping of the bit in the kerf during the turning movement of the screw driver.

3. A screw driver comprising a shank provided with a screw-driving bit having two opposite side faces and two end faces joining the side faces, one of the side faces having ribs extending from a central longitudinal line of the shank at an oblique angle to the shank towards the end faces, the ribs being adapted to engage a wall of a screw-head kerf to resist both longitudinal and transverse slipping of the bit in the kerf during the turning movement of the screw driver.

4. A screw driver comprising a shank provided with a screw-driving bit having two opposite side faces and two end faces joining the side faces, each of the side faces having ribs extending from a central longitudinal line of the shank at an oblique angle to the shank towards the end faces, the ribs being adapted to engage opposite walls of a screw-head kerf to resist both longitudinal and transverse slipping of the bit in the kerf during the turning movement of the screw driver.

5. A screw driver comprising a shank provided with a screw-driving bit having two opposite side faces and a bottom face, one of the side faces being formed with one or more ribs extending at an oblique angle to the shank and in substantially the plane of said side member for engaging a side wall of a screw-head kerf to resist both longitudinal and transverse slipping of the bit in the kerf during the turning movement of the screw driver, and the bottom face being provided with teeth.

In testimony whereof, I have hereunto subscribed my name.

BERNHARD THAL.